Patented June 10, 1930

1,762,719

UNITED STATES PATENT OFFICE

ERWIN HOFFA AND HANS HEYNA, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

2-SUBSTITUTED-1-METHYL-PHENYL-3-THIOGLYCOLIC ACID

No Drawing. Application filed November 24, 1928, Serial No. 321,756, and in Germany October 23, 1926.

Our present invention relates to 2-substituted 1-methylphenyl-3-thioglycolic acid compounds.

We have found that the compounds of the following formula:

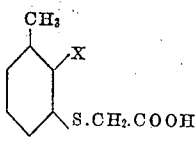

wherein X stands for the CN- or COOH-group, are obtainable by diazotizing a 1-methyl-3-aminobenzene compound, which is substituted in the 2-position by a CN- or COOH- group, transforming the diazo group according to the so-called xanthogenate process into the SH-group and converting the latter by means of chloroacetic acid into the S.CH$_2$.COOH-group.

1-thioglycol-3-methylbenzene-2-carboxylic acid may also be obtained by starting for instance from 2-methyl-6-chloro-1-benzoic acid and exchanging the halogen for the SH-group according to the process of German patent specification No. 189200, which group may then be transformed into the S.CH$_2$.COOH-group, as above described.

The substances thus obtained are valuable starting materials for the preparation of indigoid dyestuffs containing the grouping

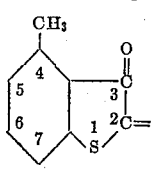

wherein the 5-, 6- and 7-positions are occupied by hydrogen.

The following examples serve to illustrate our invention, but they are not intended to limit it thereto, the parts being by weight.

(1) 132 parts of 1-amino-2-cyano-3-methylbenzene, melting at 128° C., are stirred together with 30 parts of hydrochloric acid of 22 Bé. and 30 parts of water and there are then added at 0° C.-5° C. 20 parts of sodium nitrate solution of 40% strength. The diazo solution is run at 70° C.-80° C. into a solution of 20 parts of potassium xanthogenate, 30 parts of sodium carbonate and 100 parts of water. The mixture is cooled to 0° C., filtered and the mass remaining on the filter is heated to boiling with 50 parts of alcohol, 25 parts of caustic soda solution of 40° Bé. and 50 parts of water for 2 hours. The alcohol is distilled off; the residue is mixed with 200 parts of water and 15 parts of neutralized chloroacetic acid and the whole is stirred for several hours at ordinary temperature. The mixture is filtered and acidified. The 3-methyl-2-cyanophenyl-1-thioglycolic acid, which precipitates in the form of white crystals, is filtered off by suction. It crystallizes from glacial acetic acid or from toluene in colorless needles, melting at 147° C.-149° C.

The parent body can be made by substituting in the 1-methyl-2-amino-3-nitrobenzene for the amino-group cyanogen and reducing the nitro-group to the amino-group.

(2) 151 parts of 1-amino-3-methylbenzene-2-carboxylic acid of the melting point 125° C., are stirred together with 200 parts of water and 30 parts of hydrochloric acid of 22° Bé. and there are then added at 0° C.-5° C. 18 parts of a sodium nitrite solution of 40% strength. The clear diazo solution is run, while well stirring, at 0° C.-5° C., into a solution of 20 parts of potassium xanthogenate, 50 parts of sodium carbonate and 200 parts of water. 45 parts of caustic soda solution of 40° Bé. are then added, the mixture is heated during 1 hour up to 80° C.-100° C. and stirred at this temperature for 2 hours. At a temperature of 30° C. 15 parts of neutralized chloracetic acid are slowly added and the mixture is filtered and acidified. From the acid solution the 1-thioglycol-3-methylbenzene-2-carboxylic acid is extracted with ether. It crystallizes into colorless needles, melting at 140° C.

The 1-amino-3-methylbenzene-2-carboxylic acid may be prepared by substituting in the 3-nitro-2-amino-1-methylbenzene for the NH$_2$-group the CN-group, saponifying the latter so as to obtain the COOH-group and reducing the nitro group to the amino group.

This application is to be regarded as a continuation-in-part of our application Ser. No. 226,039, filed on October 13, 1927.

We claim:

1. As new products, the compounds of the general formula:

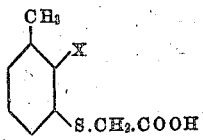

wherein X stands for the CN- or COOH, being colorless crystalline bodies, which by a treatment with an alkali are transformed into derivatives of 4-methylthionaphthene which on their part can be converted to known methods into 4.4'-dimethylthioindigo.

2. As a new product, the 2-cyano-1-methylbenzene-3-thioglycolic acid of the formula:

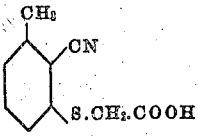

being a colorless crystalline compound, melting at 147° C.–149° C.

In testimony whereof, we affix our signatures.

ERWIN HOFFA.
HANS HEYNA.